June 23, 1964     T. THOMAS ETAL     3,138,083
FOCAL PLANE SHUTTER DEVICE
Filed Jan. 29, 1963
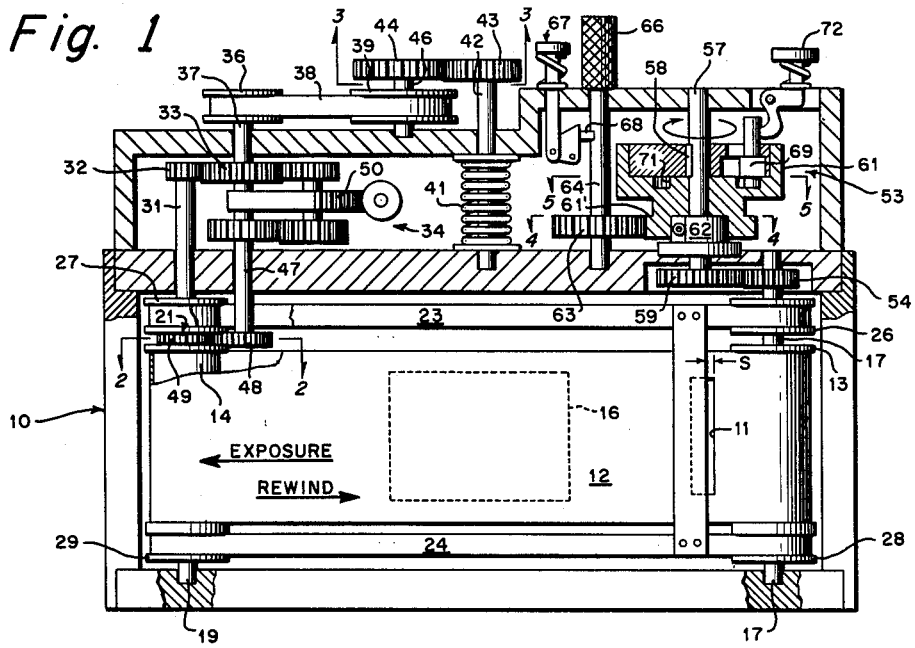
Fig. 1
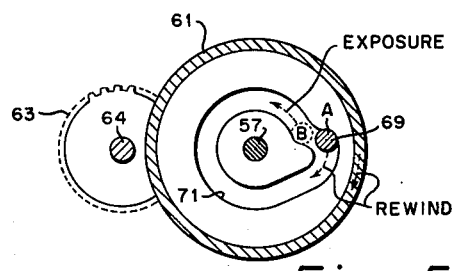
Fig. 5
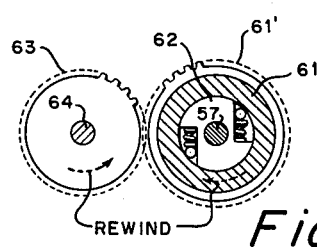
Fig. 4
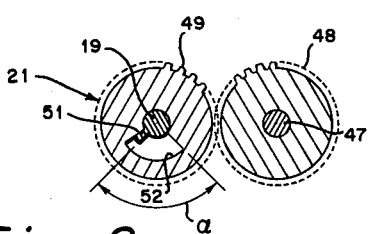
Fig. 3
Fig. 2
INVENTORS
TERRY THOMAS
RICHARD D. DAFRICO
BY
ATTORNEY United States Patent Office
3,138,083
Patented June 23, 1964

3,138,083
FOCAL PLANE SHUTTER DEVICE
Terry Thomas, Jenkintown, and Richard D. Dafrico, Ambler, Pa., assignors to the United States of America as represented by the Secretary of the Navy
Filed Jan. 29, 1963, Ser. No. 254,842
7 Claims. (Cl. 95—57)
(Granted under Title 35, U.S. Code (1952), sec. 266)

The invention herein described may be manufactured and used by or for the Government of the United States of America for governmental purposes without the payment of any royalties thereon or therefor.

The present invention relates to photographic cameras and more particularly to improvements in high speed focal plane shutters for photographic cameras.

A common method for actuating camera shutters utilizes springs due to their simplicity and low cost. But in cameras having focal plane shutters employing extremely sensitive film, spring-type motors are usually found to be unsuitable. This is because shutters driven by this mode tend to increase in speed as the exposure slit crosses the picture format resulting in one side of the picture being more exposed than the other side. At the extremely high-speed films contemplated for aerial photography, heretofore known devices for obtaining uniform exposure with focal plane shutters fall short of satisfying present requirements. For example, a constant shutter speed was merely approximated, the drive connections were subject to slippage, precision parts were required thereby increasing inertial effects, or the mechanisms became extremely sophisticated and complex to the extent that costs were prohibitive for many applications.

Accordingly, it is an object of the present invention to overcome the above drawbacks by providing a focal plane shutter mechanism for a camera in which film is uniformly exposed at high speed over the entire picture format, wherein the shutter is driven during exposure of the picture format by a spring-type motor, and which is especially adapted for employing extremely sensitive high-speed film in aerial photography missions.

Another object of the invention is to provide an improved focal plane shutter in which the nonlinear velocity output of the shutter drive motor is transposed into a constant velocity to the shutter.

Still another object of the invention is to provide an improved high speed, spring-actuated focal plane shutter in which the slit width defined thereby is adjustable for a desired film exposure.

Still another object of the invention is to provide a relatively simple and inexpensive high speed, spring-driven focal plane shutter especially suitable for aerial photographic cameras such as used in military reconnaissance and geological or meteorological surveys.

Various other objects and advantages will appear from the following description of one embodiment of the invention, and the most novel features will be particularly pointed out hereinafter in connection with the appended claims.

With these and other objects in view, the illustrated embodiment of the invention may be generally characterized as comprising a leading mask and follower curtain drivingly connected to the output of a spring motor through non-circular transmission gears, the mask being further connected to a release and rewind mechanism. Intermediate of the curtain and the non-circular gears there is included a lost-motion connection for positioning the curtain relative to the mask to occlude light from the picture format during rewind and epicyclic gears for adjusting the relative position of the follower to the mask thereby varying the exposure aperture. The non-circular gears comprise a pinion gear and a spur wheel in which the pitch loci are varied to produce a constant velocity output on the focal plane shutter from the spring motor over a picture format of extremely sensitive high-speed film. These and other novel features characteristic of the invention are now to be described in greater particularity hereinbelow.

In the drawings:
FIG. 1 is a diagrammatic representation of a focal plane shutter device of the present invention with portions thereof cut away to show pertinent structural details;
FIG. 2 represents a cross-sectional view of a lost-motion connection of the shutter device taken along the line 2—2 of FIG. 1;
FIG. 3 represents a view of the non-circular transmission gears of the shutter device taken along the line 3—3 of FIG. 1;
FIG. 4 represents a cross-sectional view of a roller clutch of the shutter device taken along the line 4—4 of FIG. 1; and
FIG. 5 represents a cross-sectional view of the shutter release and rewind mechanism of the shutter device taken along the line 5—5 of FIG. 1.

In the illustrated embodiment of the invention, primary structural support for the focal plane shutter device obtains from a housing, indicated generally by the numeral 10, which is attachable in any convenient manner to a film magazine and optical system, not shown. The film exposure aperture has its trailing edge defined by a rectangular opening 11 transversely formed in a flexible, elongated follower curtain 12 with the opposite ends thereof rolled onto a pair of parallel curtain drums 13 and 14. The drums are respectively positioned at opposite sides of the housing 10 so that the opening 11 in the curtain 12 will traverse the entire picture format shown in outline by the broken-line rectangle 16. The drum 13 is rotatably supported along its cylindrical axis in the housing 10 on a shaft 17 for rotation independently therefrom, while the drum 14 is coaxially fixed at one end of a shaft 19 for rotation therewith and at the other end by a lost-motion connection 21 described in further detail hereinbelow.

The width S of the exposure aperture is determined by the relative position of a leading mask 22 which has its trailing edge parallel to the trailing edge of the opening 11. The mask 22 is connected at its ends between two endless flexible bands 23 and 24 flanking the curtain 12. The band 23 is held taut between a driven sheave 26 and a driver sheave 27 which are coaxially supported adjacent to corresponding ends of the curtain drums 1 and 14, respectively, and are rotatable independently therefrom. The band 24 is similarly supported on idler sheaves 28 and 29 at the opposite ends of the drums 13 and 14. A mask driver shaft 31, having the driver sheave 27 coaxially fixed at one end thereof, is journaled in the housing 10 with a pinion 32 fixed at the other end thereof meshing with a sun gear 33 of epicyclic transmission gears, indicated generally by the numeral 34. The sun gear 33 is driven through shaft 37, a pulley 36, a pulley belt 38 and a pulley 39. A torsional spring 41 secured at one end to the housing 10 and the other end to a shaft 43 is drivingly connected to the pulley 39 through non-circular gears 43 and 44 and a shaft 46. The actual configuration of these gears is described in more particularity hereinbelow.

The sun gear 33 rotation is also transmitted through the epicyclic gears 34 to a coaxial curtain drive shaft 47 which has an output gear 48 fixed thereto drivingly connected to a drum gear 49 in the lost-motion connection 21. The transmission speed ratio in the gears 34 is chosen so that the curtain 12 and the mask 22 travel at exactly the same speed during exposure. For example if the diameters of the roller 14 and the sheave 27 are equal, the effective ratio in the gears 34 is unity. A carrier arm 50, manually and independently rotatable about the axis of the shaft 37, produces angular displacement between the shafts 31 and 47. It is now apparent that this angular displacement determines the exposure aperture width S; that is, the opening defined by the trailing edges of the opening 11 and the mask 22 during an exposure traverse of the shutter device.

The lost-motion connection 21 is best understood by reference to FIG. 2 wherein drum shaft 19 is shown as including a radial pin 51 extending into a segmental groove 52 radially formed in the drum gear 49. The segmental angle determines the amount of travel of the mask 22 in the return or rewind direction before the curtain 12 begins to follow. The mask 22 is at least as wide as the opening 11 in the curtain 12, and the amount of the mask travel through the angle α before the curtain 12 follows is sufficient for it to completely occlude the opening 11 during rewind. Thus, the picture format receives light only during the exposure pass of the curtain 12 and mask 22.

The release and rewind mechanism, indicated generally by the numeral 53, provides means for latching the curtain 12 and mask 22 in a cocked or starting position with the spring motor 41 stressed in torsion, and for releasing same for an exposure pass. Referring again to the drawings, a release follower 56 is connected to a release shaft 57 by means of a key 58 for rotation therewith, and counter-rotates concommittantly with a pinion 54 through a gear 59 fixed at the end of the shaft 57. The pinion 54 in turn rotates with the sheave 26 through the shaft 17 secured therebetween. The release shaft 57 is journaled in the housing 10 and provides a common axis of rotation for a release cam 61 juxtapositioned in tandem with the follower 56 with their confronting ends being in sliding relationship.

As viewed in FIG. 4, a roller clutch 62 operatively connected between the housing 10 and the release cam 61 permits clockwise rotation only of the cam 61. This rotation is manually imparted by a knurled rewind knob 66 through shaft 64 and gear 63 drivingly connected to a gear portion 61' of the cam 61. The shaft 64 is journaled in the housing 10 and may be alternatively rotated by a separate power means instead of by the knob 66. The gears 54 and 59 are selected so that the cam 61 will make one complete revolution in a complete traverse of the curtain 12 and the mask 22. Hence, a unity gear ratio between the gears 63 and 61' also requires one complete revolution of the rewind shaft 64 and knob 66. A one-revolution turn of the knob 66 is metered by a rewind release button 67 which is spring biased into normal engagement with an arm 68 extending from the shaft 64. Momentary depression of the rewind release button 67 permits 360° of counterclockwise rotation of the knob 66 and the arm 68 again engages the release button 67.

As the cam 61 advances clockwise during rewind, it also pulls the release follower 56 against the force of the spring motor 41 for one complete revolution to the cocked position. This is accomplished through a follower release pin 69 which is parallel to the axis of the follower 56 and radially slidable therein. A short cylindrical portion at one end of the pin 69 protrudes into a continuous cam race 71 formed in the cam 61 about its rotation axis. The race 71 determines the radial position of the pin 69 for relative angular positions of the follower 56 and the cam 61.

The configuration of the race 71 may be best described as being substantially a 360-degree spiral groove made continuous by a radial groove joining the inner and outer ends. In the cocked position wherein the shutter device is ready for an exposure pass, the pin 69 is in the position A shown in solid lines in FIG. 5. That is, the pin 69 is positioned in the race 71 at the outer end of the spiral, being urged there by the force of the spring motor 41 transmitted through the appurtenant elements described hereinabove. A shutter release button 72, normally urged by a spring therein to a non-releasing position as shown, operatively engages an upper projection of the pin 69 when the shutter is in the cocked position. When the shutter release button 72 is momentarily depressed, the pin 69 slides to an escape position indicated by the letter B in FIG. 5 in the race 71 thereby disestablishing the drive connection between the cam 61 and follower 56 to permit the spring motor 41 to drive the follower 56 counterclockwise for an exposure pass of the curtain 12 and the mask 22. When the pin 69 and follower 56 have revolved one complete revolution and the shutter has completed its traverse, the pin 69 strikes the steep portion of the race 71 and stops. The shutter may then be rewound by depressing the rewind release button 67 and rotating the knob 66 in the manner previously described.

The configurations of the intermeshing non-circular gears 43 and 44, as approximated in FIG. 3, are predicated on utilizing a torsion spring motor 41 with a uniform spring constant throughout its active angle of deflection. In the illustrated example, the first 25 percent of shutter travel during exposure is allocated to accelerating the mask 22 and curtain 12 to a constant terminal velocity desired to be maintained across the picture format. The gear ratio is therefore constant for the first 90 degrees of rotation of the gear 43. Without any further change in the gear ratio, of course, the shutter device would continue to accelerate in proportion to the acceleration of the spring motor 41. However, the gear ratio does begin to gradually change to effect a decrease in the speed of the gear 44 with respect to the gear 43. This change of gear ratio takes into account the decrease in spring force manifested by relaxation of the spring motor 41. Since the curtain 12 and mask 22 are traveling at a constant velocity for the remaining 75 percent of travel, inertial effects are restricted merely to the gear 43 and the shaft 42. Shutter friction being extremely small in relation to the force imparted by the spring motor 41, may be neglected without consequence.

Having described one embodiment of the invention, many advantages derived therefrom should now be readily apparent. For example, a constant speed focal plane shutter device is obtained utilizing a variable speed output from a spring motor. It is relatively simple and inexpensive to manufacture and is especially suitable for aerial photographic cameras requiring extremely sensitive high-speed film. The device is operative at high shutter speeds and provides an adjustable exposure aperture for optimum versatility.

It will be understood of course that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a focal plane shutter device for cameras, the combination comprising:
   a pair of curtain drums spaced in parallel relation to each other;
   a curtain wound endwise therebetween and having an aperture therein;
   a sheave coaxial with each of said drums and supporting an endless band therebetween;
   a mask fixed to said band adjacent to the aperture of said curtain defining thereby the width of the exposure slit during exposure;
   speed transforming means having an output drivingly connected to one of said sheaves for transporting the mask across a picture format;
   epicyclic gear means and lost-motion means connected in series between the output of said transforming means and one of said drums for transporting said curtain in unison with said mask, said epicyclic gear means including carrier adjusting means for varying the position of said curtain relative to said mask, and said lost-motion means providing limited relative motion between said mask and said curtain for occluding the aperture during rewind;

a spring motor drivingly connected to the input of said transforming means for transporting said mask and curtain in one direction during exposure; and rewind means operatively connected to one of said sheaves for transporting said curtain and mask in the opposite direction during rewind;

said transforming means including gears having pitch loci determined for translating the velocity output of said spring motor to a constant velocity at said mask;

whereby a uniform exposure is attained throughout the picture format for all film sensitivities.

2. In a focal plane shutter device for cameras, the combination comprising:

a curtain transportable endwise and having an aperture therein;

a mask adjacent to the aperture of said curtain defining thereby the width of the exposure slit during exposure;

speed transforming means having an output drivingly connected to said mask for transporting the mask across a picture format;

an epicyclic gear means and a lost-motion means connected in series between the output of said transforming means and said curtain for transporting said curtain in unison with said mask, said epicyclic gear means including slit adjusting means for varying the position of said curtain relative to said mask, and said lost-motion means providing limited relative motion between said mask and said curtain for occluding the exposure aperture during rewind;

spring means drivingly connected to the input of said transforming means for transporting said mask and curtain in one direction during exposure; and rewind means operatively connected to said mask for transporting said curtain and mask in the opposite direction during rewind;

said transforming means including gears having pitch loci determined for translating the velocity output of said spring means to a constant velocity output;

whereby a uniform exposure is attained throughout the picture format for all film sensitivities.

3. In a focal plane shutter device for cameras, the combination comprising:

a curtain transportable endwise and having an aperture therein;

a mask adjacent to the aperture of said curtain defining thereby the width of the exposure slit during exposure, speed transforming means having an output drivingly connected to said mask for transporting the mask across a picture format, an epicyclic gear means drivingly connected between the output of said transforming means and said mask for transporting said curtain in unison with said mask, said epicyclic gear means including slit adjusting means for varying the position of said curtain relative to said mask;

resilient means drivingly connected to the input of said transforming means for transporting said mask and curtain in one direction during exposure; and rewind means operatively connected to said mask for transporting said curtain and mask in the opposite direction during rewind;

said transforming means including gears having pitch loci determined for translating the velocity output of said resilient means to a constant velocity output;

whereby a uniform exposure is attained throughout the picture format for all film sensitivities.

4. In a focal plane shutter device for cameras, the combination comprising:

a curtain transportable endwise and having an aperture therein, a mask adjacent to the aperture of said curtain defining thereby the width of the exposure slit during exposure, speed transforming means having an output drivingly connected to said mask and said curtain for transporting them across a picture format, resilient means drivingly connected to the input of said transforming means for transporting said mask and curtain in one direction during exposure, and rewind means operatively connected to said mask for transporting said curtain and mask in the opposite direction during rewind, said transforming means including gears having pitch loci determined for translating the velocity output of said resilient means to a constant velocity output, whereby the picture format is uniformly exposed.

5. A focal plane shutter comprising:

a transportable curtain having an aperture therein, a transportable mask adjacent to the aperture and drivingly connected to said curtain, speed transforming means having an output drivingly connected to said mask for transporting said mask and curtain across a picture format, resilient means drivingly connected to the input of said transforming means for producing motion in one direction during exposure, and rewind means operatively connected to said mask for transporting said curtain and mask in the opposite direction during rewind, said transforming means including gears having pitch loci determined for translating the velocity output of said resilient means to a constant velocity.

6. A focal plane shutter comprising:

first means forming an aperture therein, second means having an output drivingly connected to said first means for transporting the latter across a picture format, resilient means drivingly connected to the input of said second means for transporting said first means in one direction during exposure, and rewind means operatively connected to said first means for transporting the latter in the opposite direction during rewind, said second means including gears having pitch loci determined for translating the velocity output of said resilient means to a constant velocity output.

7. A focal plane shutter comprising:

first means having an aperture therein, second means having an output drivingly connected to said first means for transporting the latter across a picture format, resilient means drivingly connected to the input of said second means for transporting said first means during exposure, said first means including gears having pitch loci determined for translating the velocity output of said resilient means to a constant velocity output.

No references cited.